Figure 1:
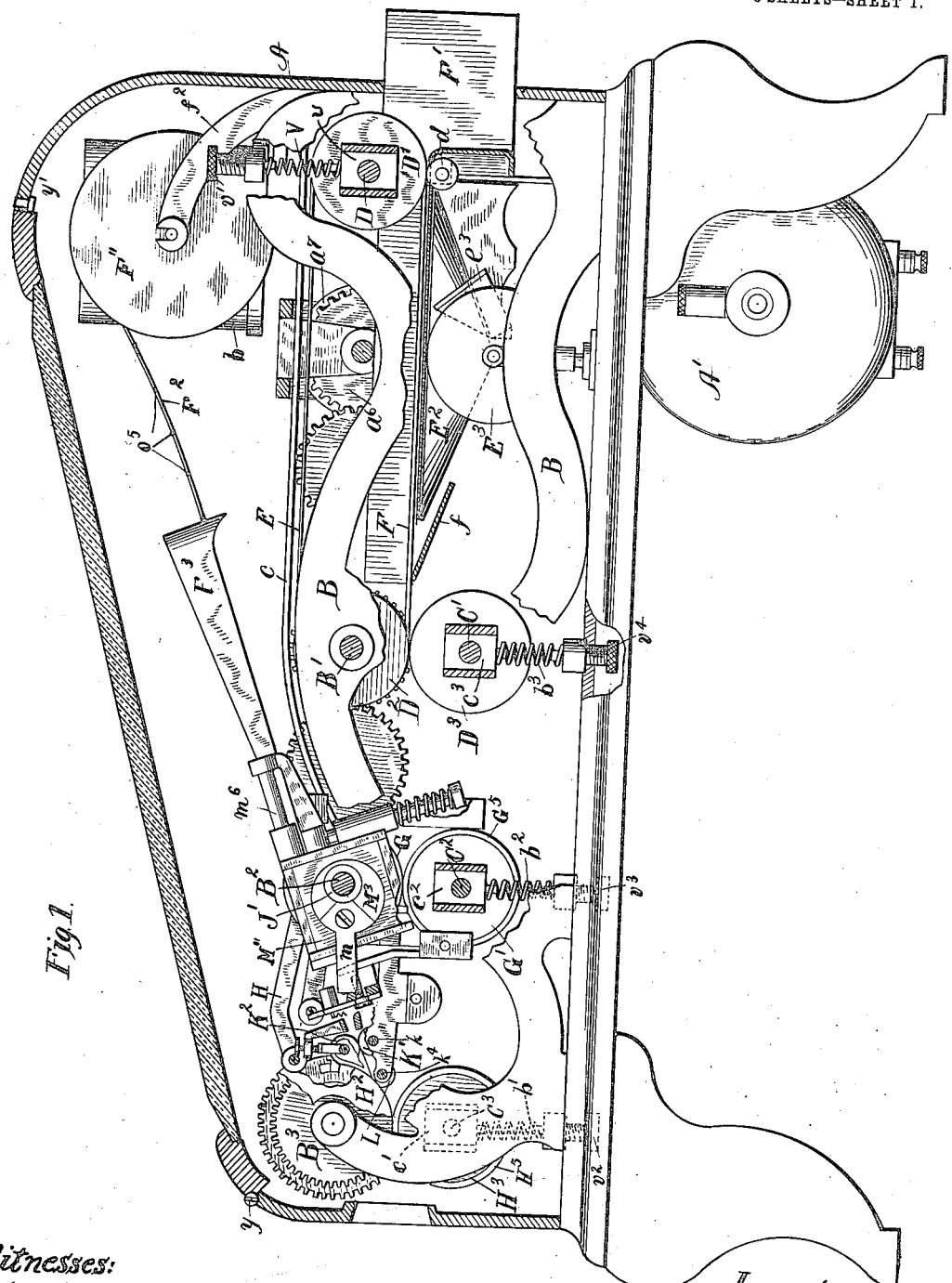

J. J. SCHERMACK.
ENVELOP SEALING AND STAMPING MACHINE.
APPLICATION FILED JAN. 11, 1906.

961,465.

Patented June 14, 1910.
8 SHEETS—SHEET 1.

Witnesses:
Chas. F. Barnes
C. H. Ames

Inventor
Joseph J. Schermack
By Thomas King Atty.

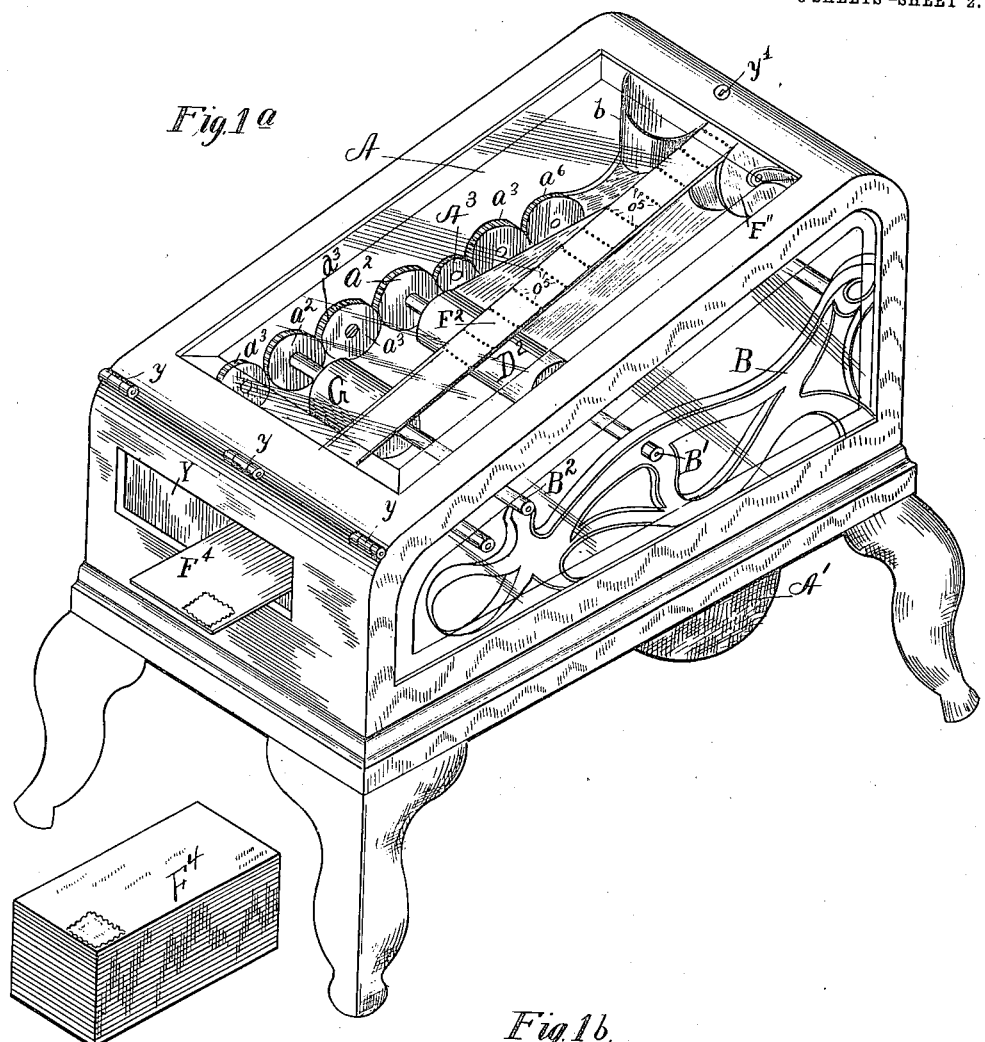

J. J. SCHERMACK.
ENVELOP SEALING AND STAMPING MACHINE.
APPLICATION FILED JAN. 11, 1906.
961,465.
Patented June 14, 1910.
8 SHEETS—SHEET 3.
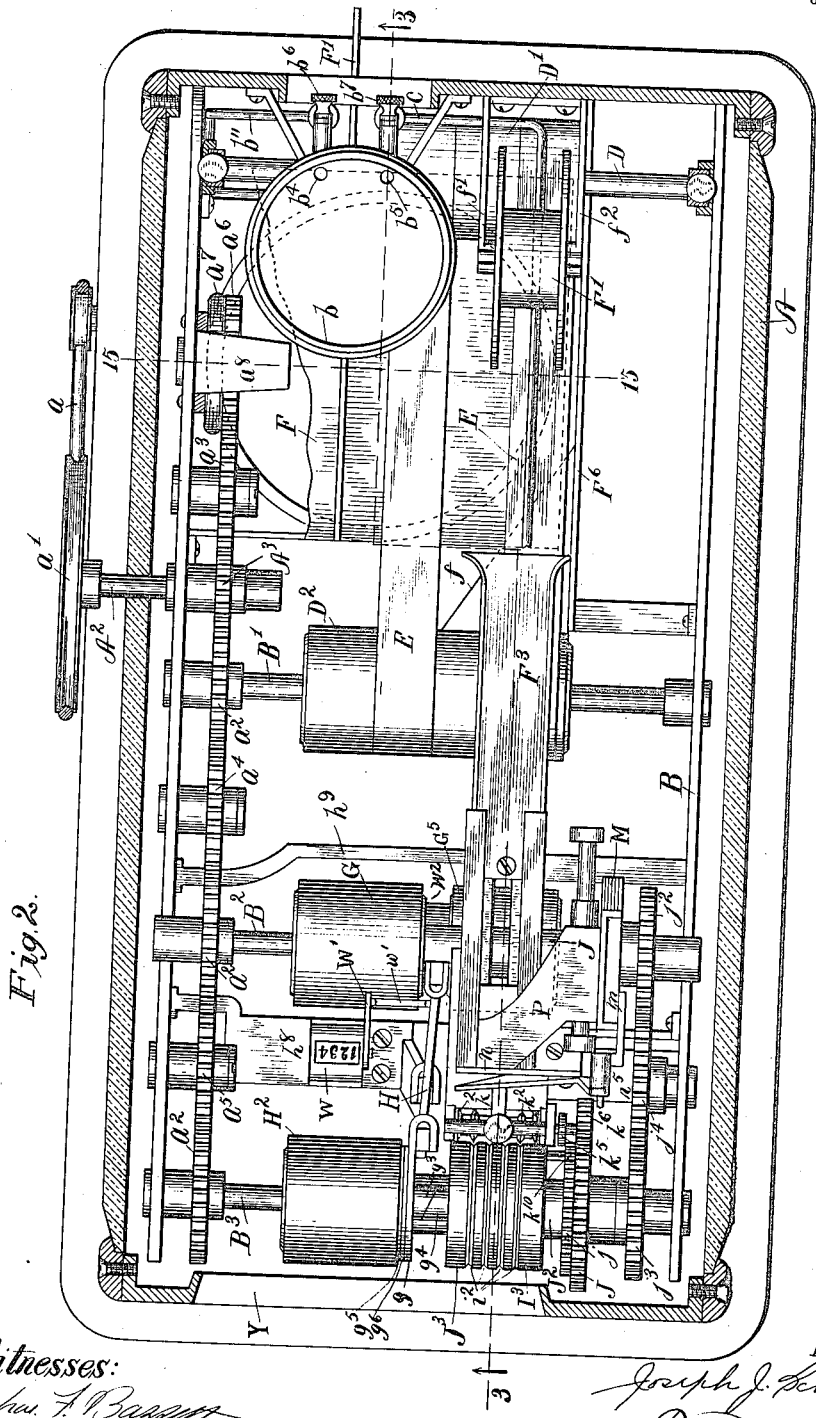
Witnesses:
Inventor
Joseph J. Schermack,
By
Atty.

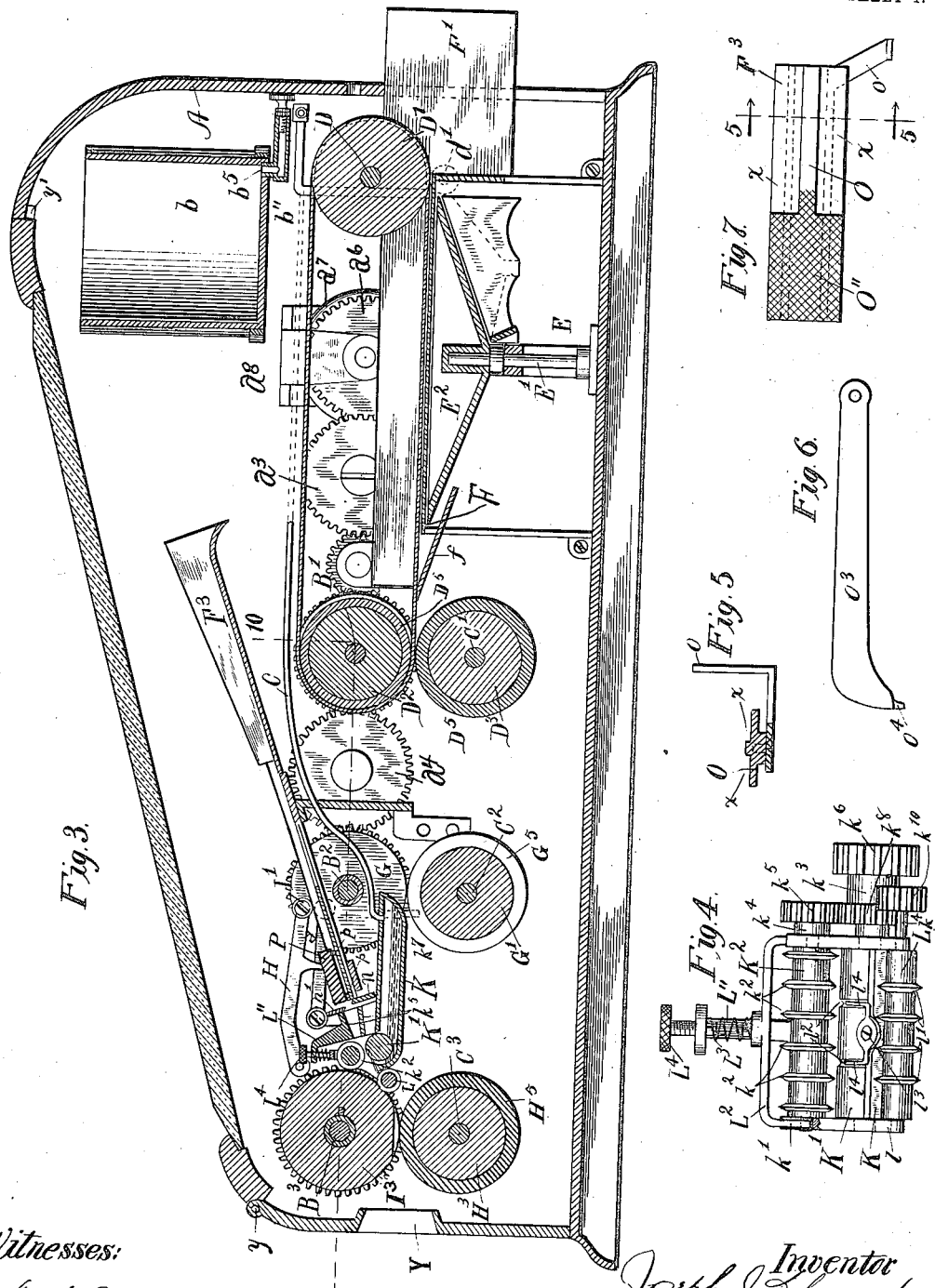

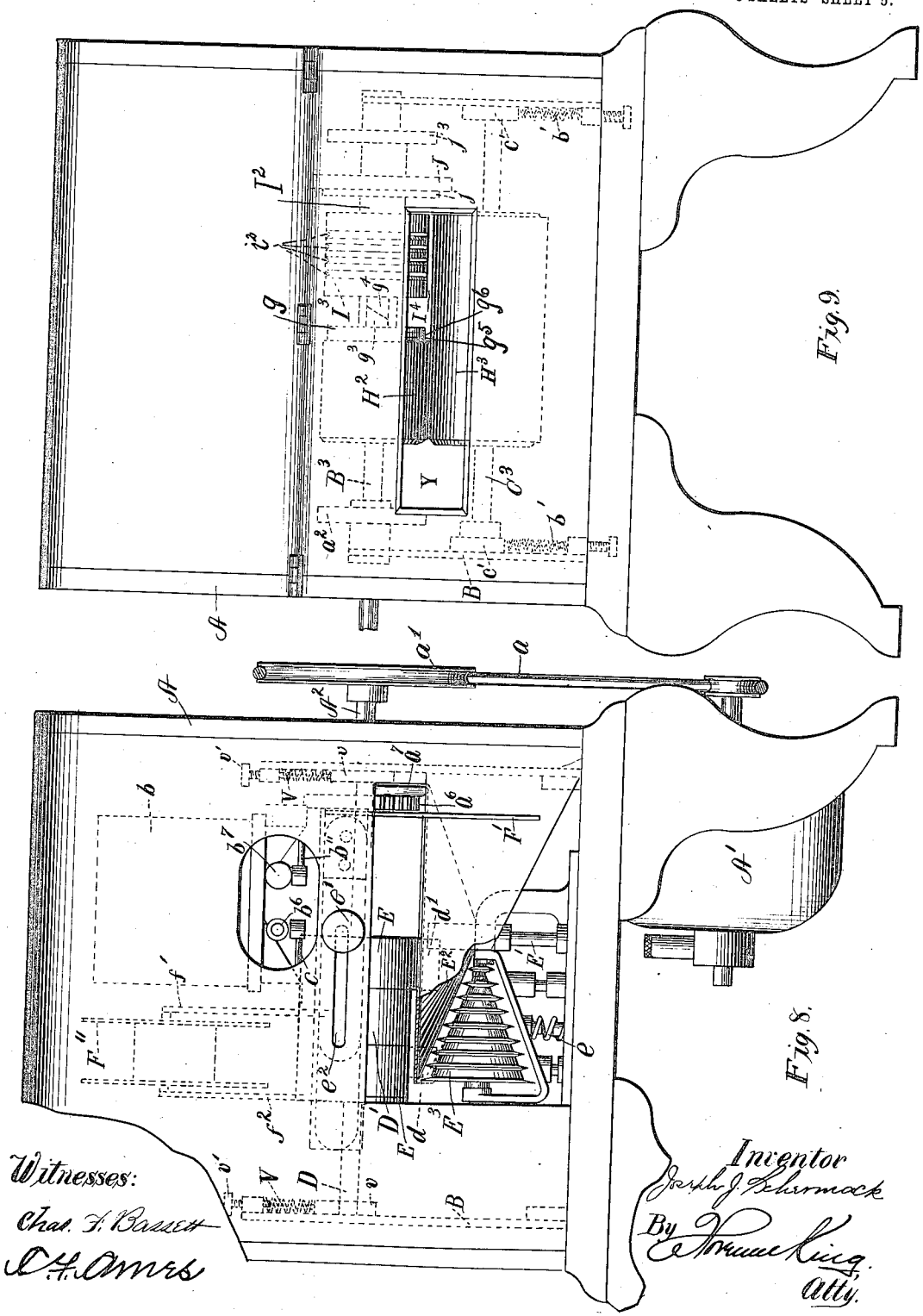

J. J. SCHERMACK.
ENVELOP SEALING AND STAMPING MACHINE.
APPLICATION FILED JAN. 11, 1906.
961,465.
Patented June 14, 1910.
8 SHEETS—SHEET 6.
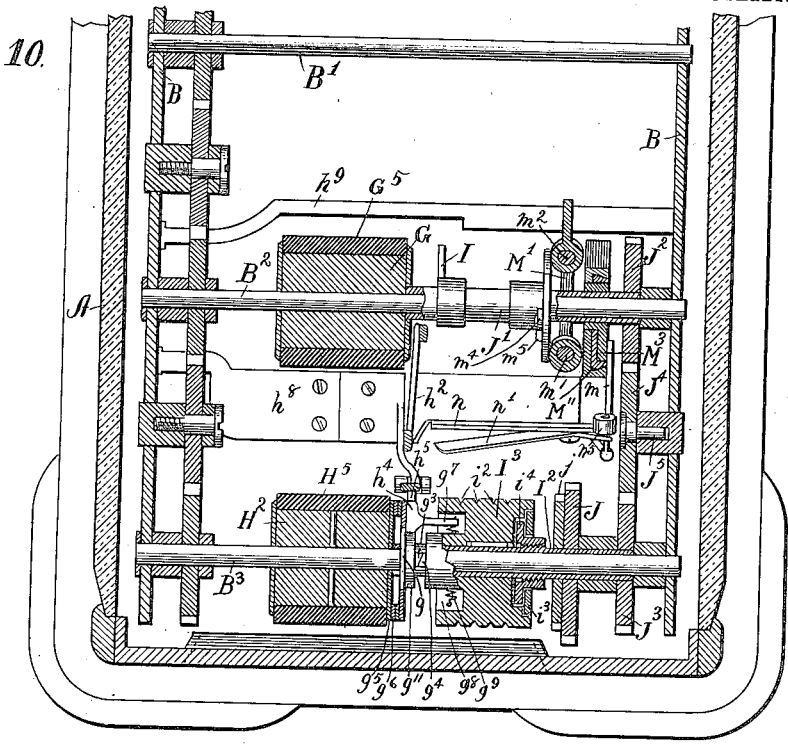
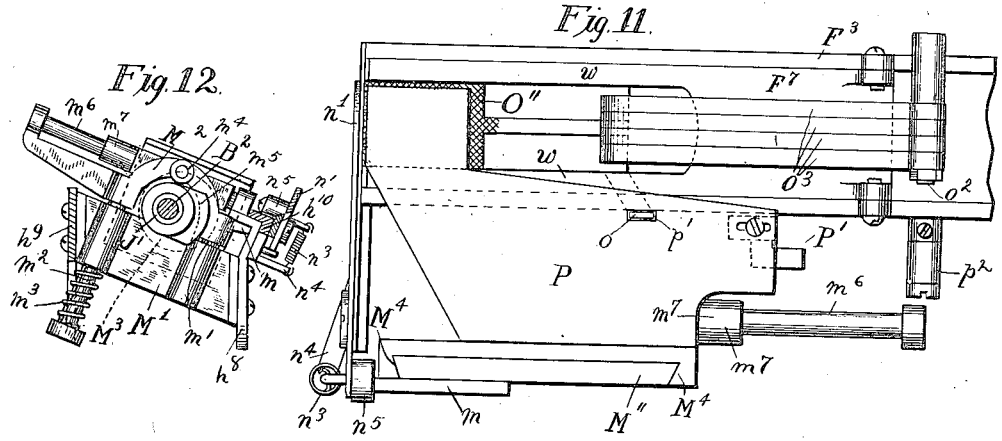
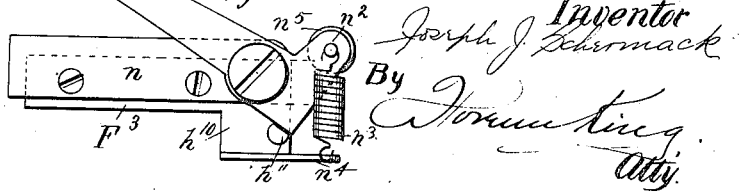

J. J. SCHERMACK.
ENVELOP SEALING AND STAMPING MACHINE.
APPLICATION FILED JAN. 11, 1906.
961,465.
Patented June 14, 1910.
8 SHEETS—SHEET 7.
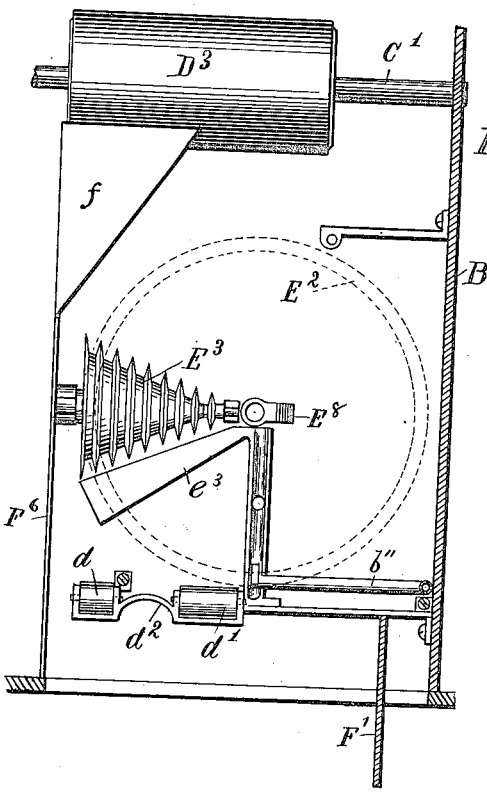
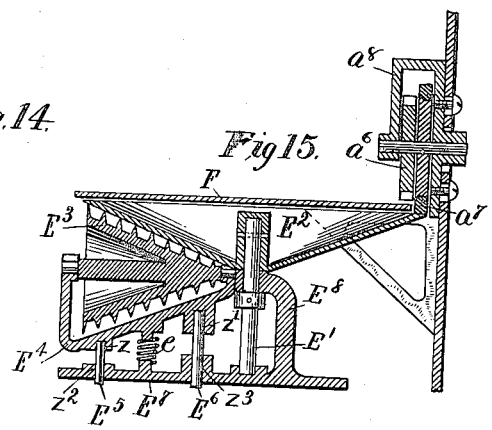
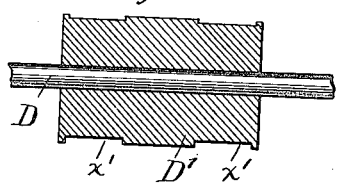
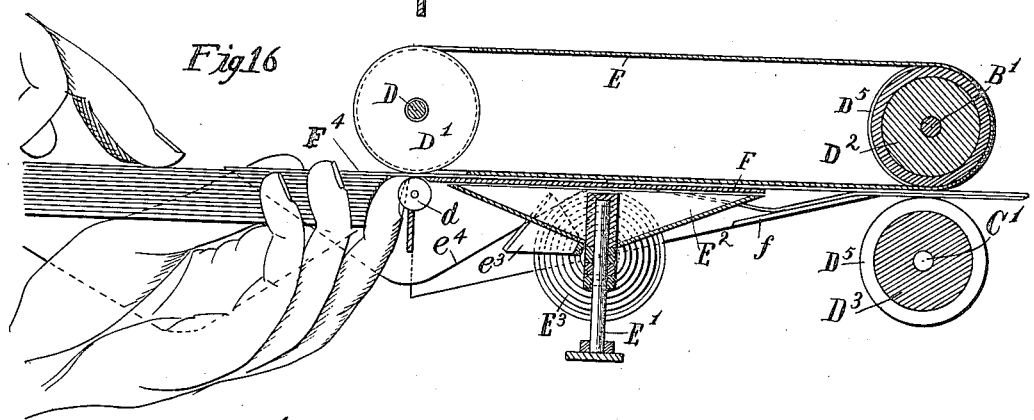
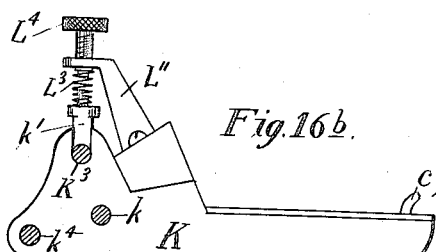

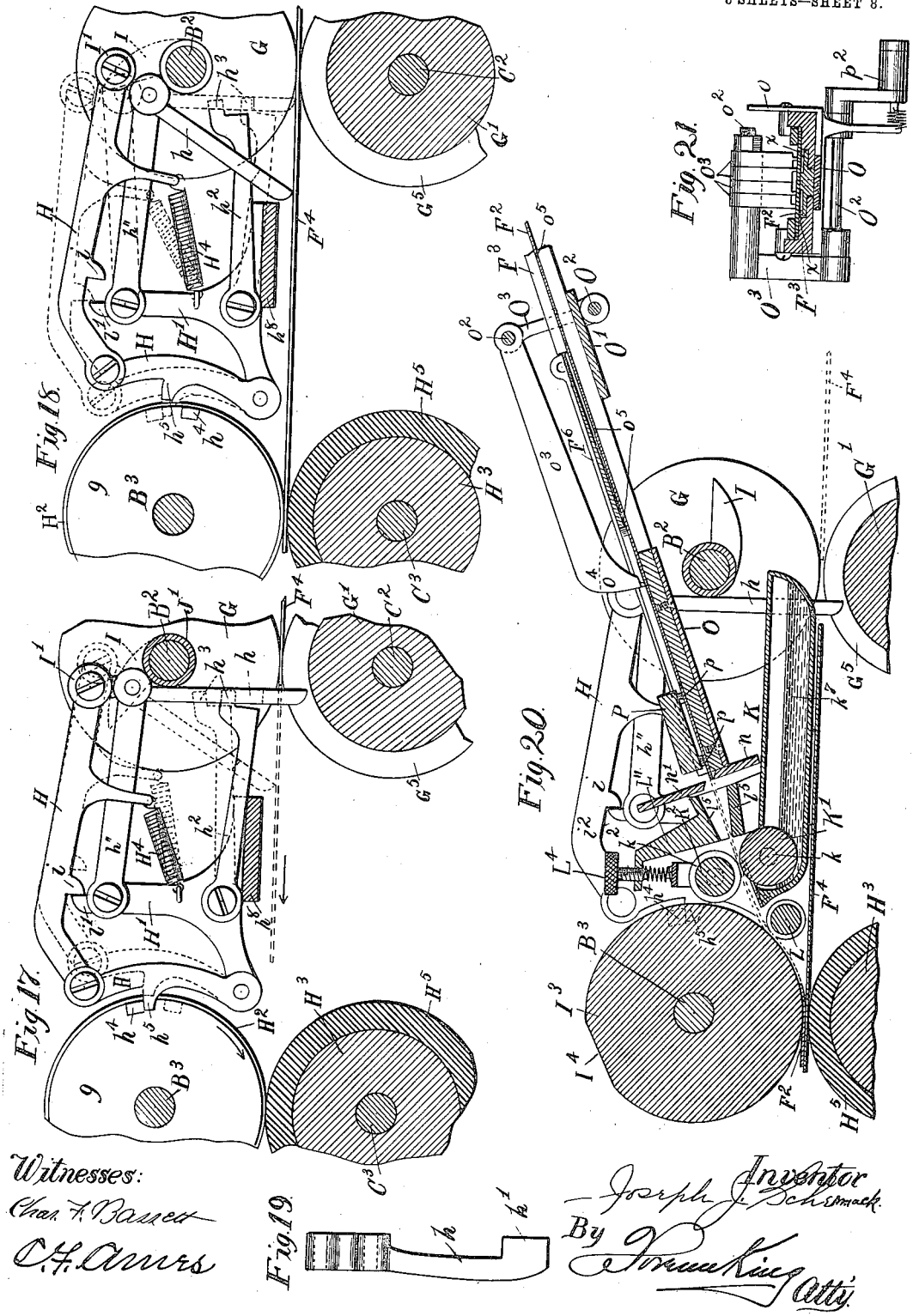

UNITED STATES PATENT OFFICE.

JOSEPH J. SCHERMACK, OF CHICAGO, ILLINOIS, ASSIGNOR, BY DIRECT AND MESNE ASSIGNMENTS, TO DETROIT MAILING MACHINE COMPANY.

ENVELOP SEALING AND STAMPING MACHINE.

961,465.

Specification of Letters Patent. Patented June 14, 1910.

Application filed January 11, 1906. Serial No. 295,630.

*To all whom it may concern:*

Be it known that I, JOSEPH J. SCHERMACK, a citizen of the United States, and resident of Chicago, Illinois, have invented certain new and useful Improvements in Envelop Sealing and Stamping Machines, of which the following, taken in connection with the drawings, is a specification.

My invention has for its object the production of a machine which will automatically seal and stamp envelops, one which shall be continuous in its operation, and one in which the envelops, after being fed into the machine are advanced therethrough without being interrupted or stopped in their course.

A further object of my invention is to provide a machine of this class so constructed that the stamps may be arranged inside of the case and locked therein, also to provide means for counting and registering every stamp applied by the machine. The envelops are fed one at a time to the machine, the operator holding a stack of envelops in one hand and with the other sliding them to the feeding or advancing rollers.

A further object of my invention is to so construct a machine that the stamp applying mechanism is operative only at the time and upon the advancing envelops as they are being passed through the machine; also to apply the stamp by rolling it upon the envelop, and in this manner permitting the operation to be continuous, at the same time to apply a stamp in the proper position upon each successive envelop.

This invention is designed to be used more particularly in places of business having a large amount of mail, where the time consumed in sealing the envelops is so great as to necessitate clerical help especially to take care of the same. With this machine the envelops can be sealed and stamped, regardless of the thickness of the inclosures, just as rapidly as they can be fed into the machine, which is at the rate of one hundred and fifty to one hundred and sixty per minute. The mechanism is very positive and accurate in its operation, and is so timed that as each envelop moves forward it automatically actuates the stamp mechanism to release, moisten and place a stamp at the proper place upon an envelop, sealing the same thereto as it advances through the machine, thereby providing a machine which receives the envelops at one end, moistens and seals the same, applies the stamps thereto, and ejects the envelop from the machine at the opposite end thereof, ready for mailing.

Many other novel features will be hereinafter more fully pointed out in the description and claims.

In the accompanying drawings forming part of this specification, and in which like characters of reference indicate corresponding parts, I have illustrated one form of my invention, although the same may be carried into effect in other ways without in the least departing from the spirit of my invention, and in these drawings, Figure 1 is a side elevation of the complete machine with the frame work partly broken away to illustrate the working parts, and the outer casing being in section; Fig. 1$^a$ is a perspective view of the complete machine inside the case and ready for operation; Fig. 1$^b$ is a plan view of the feeding plate in initial position; Fig. 2 is a top plan view with the casing in section; Fig. 3 is a longitudinal cross section, taken on line 3—3 of Fig. 2; Fig. 4 is a front elevation of the stamp moistening device; Fig. 5 is a section of the lower stamp feeding plate taken on line 5—5 of Fig. 7; Fig. 6 is a side elevation of the stamp feeding arm; Fig. 7 is a plan view of the lower stamp feeding plate; Fig. 8 is a front elevation of the machine; Fig. 9 is a rear elevation of the same; Fig. 10 is a fragmentary horizontal section illustrating the stamp operating mechanism, taken on line 10—10 of Fig. 3; Fig. 11 is a top plan view of the stamp feeding mechanism; Fig. 12 is a side elevation of the stamp feeding and clamping mechanism; Fig. 13 is a front elevation of the stamp actuating mechanism; Fig. 14 is a plan view with the moistening cone and platform removed, illustrating the corrugated cone and flap guard for guiding the entrance of the flap to the cones; Fig. 15 is a transverse sectional view taken on line 15—15 of Fig. 2 illustrating the construction of the cones and the manner of driving the same; Fig. 16 illustrates the manner of feeding the envelops to the moistening and sealing device;

Fig. 16ª is a cross section of the feeding roller D'; Fig. 16ᵇ is a side elevation of the stamp moistening tank; Fig. 17 is a side elevation of the stamp controlling mechanism in full lines in normal position and dotted lines in its released position; Fig. 18 is a similar view with full lines in the released position and dotted lines illustrating the operation of the cam to return the controlling arm to normal position, and also having return clutch stop at normal position; Fig. 19 is a front elevation of the controlling arm $h$; Fig. 20 is a section on line 3—3 of Fig. 2 illustrating the mechanism for feeding, moistening and applying the stamps to the envelops; Fig. 21 is a cross section of the stamp chute taken in advance of the stamp feeding plate P looking toward the front of the machine.

As will be seen by referring to the drawings, the machine is mounted in a case A, the bottom, feet, corners and edges of which are of metal and the top and sides of which are of glass. A motor A' is secured beneath the case A. Through an electric wire (not here shown) this motor receives its power and transmits the same through a belt $a$ to the pulley $a'$.

As shown in Fig. 1ª, the cover of the case A is hinged at $y$ to the end of the case, and at $y'$ it is provided with a lock by means of which the case may be locked, which may be desirable or necessary when a large number of stamps are on the reel.

$A^2$ is the main driving shaft, and through a train of gears hereinafter described, revolves and operates the entire mechanism.

B is the frame supporting the operating mechanism. Journaled in this frame are three upper revoluble shafts B', $B^2$, $B^3$, carrying the rollers $D^2$, G and $H^2$. Three lower revoluble shafts C', $C^2$, $C^3$, are disposed within journal boxes c', $c^2$, $c^3$, which are secured to the frame B and are supported upon the springs b', $b^2$, $b^3$, the tension of which is regulated by the screws $v^2$, $v^3$, $v^4$. Each of the shafts B', $B^2$, $B^3$, carries near one end thereof a gear wheel $a^2$, and mounted upon the shaft $A^2$ is the main driving wheel $A^3$. Idler wheels $a^3$, $a^4$, $a^5$, are journaled in the frame B of the machine and receive and transmit motion from the gear wheels $a^2$. Mounted upon and revolving with the shafts C', $C^2$, $C^3$ are the rollers $D^3$, G' and $H^3$ respectively. In operation the rollers $D^2$ and $D^3$ move together, the rollers G, G' move together and the rollers $H^2$, $H^3$ move together, as hereinafter explained. The rollers $D^2$, $D^3$, G, G', $H^2$ and $H^3$ are provided as shown with faces of rubber $D^5$, $G^5$, $H^5$, which affords a friction surface desirable in advancing the envelops through the machine. The rubber face upon the roller G' is recessed as shown at $w^2$, for a purpose hereinafter described.

Supported above the frame B is a tank which contains the fluid for moistening the envelops and stamps. This tank is provided with two outlets $b^4$, $b^5$ which are regulated by the valves $b^6$ and $b^7$. Hollow tubes $b''$, $c$, extended from the openings $b^4$, $b^5$ in the tank and through them the moistening fluid is carried to the flap moistener and stamp moistening devices hereinafter described.

D' is what I shall term the feeding roller. This roller is mounted upon a shaft D which is supported near the front end of the machine in the journal boxes $v$, $v$, which are secured to the frame B of the machine. This shaft D, through the boxes $v$, $v$, is operated under the tension of the springs V, V, which may be regulated by the thumb screws $v'$, $v'$. The periphery of the roller D' impinges upon the periphery of the small feed rollers $d$, $d'$, (Figs. 14 and 16), which rollers are mounted upon shafts which are journaled in the bearings $d^2$ directly beneath the roller D'. As shown in Fig. 16ª, the roller D', is provided with circumferential recesses, $x'$, $x'$, in which the belts E travel; said belts E transmitting motion from the roller $D^2$ to the roller D'.

Mounted upon the shafts B', C' are the sealing rollers $D^2$, $D^3$.

A shaft E' rests in a socket in the base $E^7$. A standard $E^8$ extends from the base $E^7$ and supports said shaft in upright position. The moistening cone $E^2$ rests upon and revolves on the aforesaid shaft E'. Mounted in the frame B and meshing with idler wheel $a^3$ is a gear wheel $a^6$ which carries a rubber faced disk $a^7$ (Figs. 2, 8 and 15). The disk $a^7$ comes into frictional contact with the outer edge of the cone $E^2$, and in operation transmits motion thereto. The gear $a^6$ and disk $a^7$ are mounted in a hanger $a^8$, which is made adjustable vertically to take up the wear upon the friction face of the disk $a^7$. Extending at right angles to and contiguous with said moistening cone $E^2$ is the corrugated cone $E^3$, which is supported in a hanger $E^4$. This frame is held in position by the rods $E^5$, $E^6$, fitting into sockets $z$, $z'$ in the hanger $E^4$, and $z^2$, $z^3$ in the base $E^7$.

For the purpose of keeping the flap of the envelop $F^4$ into contact with the cone $E^2$, the cone $E^3$ is allowed a slight vertical movement, and is maintained in position against the surface of the cone $E^2$ by means of the compression spring $e$ and the cone $E^3$ is driven by frictional contact with cone $E^2$. The faces of the cones $E^2$ and $E^3$ being contiguous to each other they coöperate in advancing the envelops to be moistened.

F is a platform or table immediately above the cone $E^2$ over which the envelops are passed as they are fed into the machine. A guide plate F' is provided at the right hand side of the table F which is made adjustable in relation to the stationary guard on the opposite side of the table, and is secured in position by the thumb screw $e'$ moving in the slot $e^2$. A stationary envelop guide $F^6$ is arranged at the left hand side of the table, as shown in Figs. 2 and 14.

$e^3$ is a flap guide extending into proximity to the cones $E^2$, $E^3$. This guide directs the course of the envelop flap $e^4$ as it enters the machine and guides the same between the aforesaid cones, where the gummed surface thereof is brought into contact with the moistened surface of the cone $E^2$, and is held in contact therewith by the corrugated surface of the cone $E^3$ until the envelop has traveled past the cone and is caught by the sealing rollers $D^2$, $D^3$. As the envelop passes beyond the moistening cone $E^2$, the flap $e^4$ thereof is met by another guide $f$ which presses against it and closes the envelop as it passes on its course into the sealing rollers $D^2$, $D^3$ where the moistened flap is pressed down upon the envelop and securely sealed.

Supported in hangers $f'$, $f^2$ is a revoluble reel $F''$ upon which the postage stamps $F^2$ to be used are wound and from which they are carried to the stamp chute $F^3$ where they are fed to the stamp feeding and sealing mechanism hereinafter described.

After the envelop $F^4$ has passed through the sealing rollers $D^2$, $D^3$ and been sealed it continues to travel toward the rear of the machine and is caught between the rollers G, G' and by them advanced to the stamp mechanism.

Referring to Figs. 17, 18, 19 and 20, H, H' represent the frame which is moved to actuate the stamp feeding mechanism which will now be described. H' is the standard of said frame, which rests upon the cross arm $h^8$ and has pivotally secured thereto the operative parts of said frame. Pivotally secured to said frame through the link $h''$ is the controlling arm $h$, having at one end thereof a lug or projection $h'$, Fig. 19. Pivotally secured at right angles to said arm $h$ is a corresponding arm $h^2$ which is likewise provided at the end thereof with a projection $h^3$, which in normal position rests upon the plate or cross arm $h^8$. In operation after the envelop $F^4$ has passed beyond the arm $h$, and the frame H, H' returns to normal position, the arm $h$ is locked against further operation by the projection $h^3$ until it is moved when the next envelop is passing through the machine. When said frame H, H' is in normal position as shown in full lines in Fig. 17, the arm $h$ is in vertical position, the lower end thereof extending into the recess $w^2$ in the face of the roller G', until an envelop $F^4$ moving toward the rear of the machine strikes against it and forces said arm to the position shown in dotted lines in Fig. 17 and full lines in Fig. 18. The two sections of the frame H, H', are connected at approximately the center thereof by a coiled spring $H^4$, by means of which the said frame, after being actuated, is returned to its normal position. The section H and the standard H' are provided with projections $i$, $i'$ respectively, the faces of which in normal position abut against each other, as shown in Figs. 17 and 20.

Secured to the sleeve J' and traveling therewith is a cam I (Figs. 10 and 17) which in operation moves against a small friction roller I', which is supported upon a bearing secured to the frame H. A projection $h^5$ extends from a section of the frame H which is adapted when the frame is in normal position (Fig. 17 full lines) to lie in the path of the projection $h^4$ on the friction plate $g$, and thereby hold said plate out of operation until said frame has been moved out of normal position and has carried the projection $h^5$ out of the path of the projection $h^4$ as will be hereinafter described. The friction plate $g$ is secured to a collar $g''$ which is provided with an incline $g^3$, operating against a corresponding oppositely faced incline $g^4$ on the roller $I^3$.

A roller $H^2$ is mounted upon and revolves with the shaft $B^3$. In close proximity to the end of the roller $H^2$ is a friction plate $g$ which is actuated by the movement of the frame of the stamp controlling mechanism heretofore described. A washer $g^5$ is secured to the end of the roller $H^2$, and a corresponding washer $g^6$ is secured to the friction plate $g$, said washers presenting friction faces and are adapted to come into contact when the plate $g$ has been released and the friction face $g^5$ comes into contact with the friction face $g^6$, (Figs. 2, 9 and 10). This motion is then transmitted to the sleeve $I^2$ and through the gears $J^3$, $J^4$ and $J^2$ to the sleeve J'.

The sleeve $I^2$ is loosely mounted upon the shaft $B^3$, and mounted upon this sleeve is the stamp sealing roller $I^3$ having upon the face thereof the grooves $i^2$ (Figs. 2 and 10). This roller $I^3$ is keyed or splined to the sleeve $I^2$ and has a slight longitudinal movement thereon to take up the wear upon the friction face $g^6$. One end of this roller $I^3$ is recessed, and has secured in said recess a collar $i^4$ which is screw threaded upon the sleeve $I^2$, by means of which the longitudinal movement of the roller $I^3$ is regulated. A recess $g^8$ is provided in the opposite end of the sealing roller $I^3$, into which recess the projecting arm $g^7$ extends, as shown in Fig. 10. The arm $g^7$ is secured to the friction plate $g''$. A coiled spring $g^9$ is secured at one end thereof to the arm $g^7$ and at the opposite end to the inner face of the recess $g^8$. In the operation of the machine, when the stop $h^4$ is released the tension of the spring $g^9$ is exerted upon the friction plate $g$ and revolves the same until it comes into contact with the friction face $g^6$ on washer $g^5$ which is secured to the end of the roller $H^2$, thereby actuating the stamp operating mechanism. Mounted upon and revolving with the sleeve $I^2$ is a large gear J and a small gear $j$ through which motion is transmitted to part of the stamp moistening and feeding mechanism.

A sleeve J' is loosely mounted upon the shaft $B^2$ and mounted upon this sleeve is a gear wheel $J^2$; mounted upon the sleeve $I^2$ is a gear wheel $J^3$ (Fig. 10) and journaled in a bearing $J^5$, supported by the frame B of the machine is a third gear $J^4$, which, together with the wheels $J^2$ and $J^3$ form a train of gears (Figs. 2 and 10) which transmit motion to the stamp actuating and feeding mechanism.

Supported from the cross bar $h^8$ connecting the sides of the frame of the machine B, is a tank or reservoir K (Figs. 3, 16$^b$ and 20) which is supplied from the main reservoir $b$, through the pipe $c$ with moistening liquid $k^7$ to be applied to the stamps. Mounted in bearing $k$ is a roller K' which extends inside of the tank K and the surface of which is kept moistened by the liquid therein, and which transmits said moisture to the gummed surface of the stamp as it is passed over said roller.

Journaled in the frame $k'$ (Fig. 4) is the upper stamp feeding roller $K^2$. This roller is provided upon its periphery with a plurality of circumferential projections $k^2$ corresponding with and projecting into the grooves $i^2$ in the roller $I^3$. The shafts $k^3$, $k^4$, upon which the rollers K', $K^2$ are mounted each carry a gear wheel $k^5$, $k^6$ respectively, upon the ends thereof, which receive their motion through gears mounted upon the sleeve $I^2$. The gears $k^5$, $k^8$ are in contact with each other, the gear $k^8$ receiving motion from the pinion $k^6$ meshing with the gear J. Journaled in the frame $l$ is another roller L, the face of which is in close proximity with the periphery of the roller $I^3$, which grips the stamp after it has been moistened and passes it on to a point where it meets the envelop F which is then directly beneath it. The roller L is mounted upon a shaft $k^4$, which carries upon the end thereof a pinion $k^{10}$, which meshes with the gear $j$. This roller L is also provided with circumferential projections $l'$ which extend into the grooves $i^2$ on the roller $I^3$. The stamp moistening roller K' is provided upon its periphery with circumferential grooves $l^2$ and secured to the frame of the reservoir K is a plate $l^3$ (Fig. 4) having two projecting fingers $l^4$ which extend in the grooves $l^2$ and act as guides and strippers in advancing the stamp that has been moistened by the roller K' until it is caught between the rollers L and $I^3$, and moved forward until it meets the envelop $F^4$, which is then directly beneath it. An arm L" (Figs. 3, 4, 16$^b$ and 20) is secured to the frame supporting the stamping mechanism and extends above the frame or yoke $L^2$ (Fig. 4) which supports the stamp feeding rollers. Supported between said arm and the yoke $L^2$ is a tension spring $L^3$ which is regulated by the thumb screw $L^4$, which holds the upper roller $K^2$ into contact with the lower roller K'.

Secured to the cross bar $h^8$ just in front of the stamp chute $F^3$ is a plate $h^{10}$ which is secured to the stationary cutting blade $n$, (Figs. 10 and 13), and pivotally secured thereto is the movable blade $n'$. An arm $n^2$ projects from said movable blade $n'$, to which is secured one end of a coiled spring $n^3$, the opposite end of said spring being secured to an arm $n^4$ which projects from a plate $h^{10}$. A small friction roller $n^5$ is mounted upon a shaft secured in the projection $n^2$ and is operated as hereinafter described. A stop $h^{11}$ projects from the plate $h^{10}$ and retards the movement of the movable blade $n'$.

Mounted upon the sleeve J' carried by the shaft $B^2$ is an eccentric $M^3$, carrying the eccentric block M", the edges of which are beveled and which is held in the guides $M^4$ having corresponding beveled edges. Secured to the cross bars $h^8$ and $h^9$ is a frame M' (Figs. 10 and 12) which acts as a bearing for and supports the guide rods $m'$, $m^2$ the latter of which is allowed a slight vertical movement under the tension of spring $m^3$. A yoke $M^2$ is supported or carried by the rods $m'$, $m^2$ to which is secured a small friction roller $m^4$. A cam $m^5$ is carried upon the sleeve J' and in operation travels against the friction roller $m^4$ and raises the yoke $M^2$, carrying with it other mechanism attached to the rod $m^6$, hereinafter described.

Moving in the eccentric block M" is eccentric $M^3$ having secured thereto the arm $m$ which in operation bears against the friction roller $n^5$ which moves the shearing blade $n'$ to cut the stamps as they are fed down the stamp chute $F^3$.

Secured to the lower side of the stamp chute $F^3$ is a plate O' which supports the bearing for the rock-shaft $O^2$. Rigidly secured to one end of said shaft is an upwardly extending arm $O^3$ carrying thereon a transversely extending arm $o^2$. A plurality of feeding fingers $o^3$ are pivotally secured at one end thereof to the transverse arm $o^2$, each of which fingers is provided at the free end thereof with a tooth $o^4$, said teeth being slightly out of alinement with each other. In the operation of the machine the fingers $o^4$ are moved along the stamp chute by the movement of the rock-shaft $O^2$ until one or more of the fingers engage in a line of perforations $o^5$ between the stamps and by mechanism hereinafter described advance the stamp to the proper position to be gripped between the feed plates P, O.

Pivotally secured to the stamp chute $F^3$ is a plate $F^7$, beneath which the stamps $F^2$ are passed from the reel $F''$ to the moistening and sealing mechanism. The purpose of the plate $F^7$ is to straighten or flatten out the stamps after they leave the reel $F''$. The lower end of said plate is bifurcated as shown more clearly in Fig. 11 and the forks $w, w$ of said bifurcation extend to the end of the stamp chute. The teeth $o^4$ on the fingers $o^3$ move over the surface of the stamp feeding plate between the forks of the bifurcation in the plate $F^7$, as shown in Figs. $1^b$, 11 and 21, and as the stamps are moved toward the moistening device, one or more of the teeth $o^4$ engage in the perforations $o^5$ between the stamps, thus insuring the proper position of each stamp until it is clamped between the feeding plates O and P and thereby advanced to the moistening mechanism.

Secured to the guide plate $M^4$ above the rod $m^6$ is a top feeding plate P, (Figs. $1^b$ and 11). This plate is carried by the guide plate $M^4$ and the sleeve $m^7$ on the rod $m^6$, and has a longitudinal movement corresponding with the width of a stamp, and is operated in conjunction with the lower feeding plate hereinafter described, to advance the stamps to the moistening and feeding mechanism. One end of the feed plate P extends over the stamp chute $F^3$, and is provided upon the under side thereof with a plurality of rubber feet $p$ (seen in Figs. 3 and 20). Near one end of the plate P is a slot $p'$ through which slot is extended the arm $o$ which arm is carried by the lower feed plate O. Adjustably secured to the plate P is a projecting arm $P'$, which, when the plate P is moved toward its initial position (Fig. $1^b$) comes into contact with the friction roller $p^2$ mounted upon the crank of the rock shaft $O^2$, thereby actuating the fingers $o^3$ until the teeth $o^4$ engage another stamp and carry it to the point where it is gripped between the feeding plates P, (Figs. 5, 7, 20 and 21).

The lower feed plate O, is disposed in the frame of the stamp chute $F^3$ and is movable lengthwise thereof with the upper feed plate P. An upwardly projecting arm $o$ is secured to the plate O and extends into the slot $p'$, (Fig. 11). One end of the plate O is provided with a roughened or corrugated surface $O''$ to which surface the stamp to be severed is moved by the teeth $o^4$ where it is held and advanced by the feet $p$ on the plate P, until it is severed by the blade $n'$. The outer edges $x, x$, of the plate O are cut away for a portion of its length as shown in Figs. 5, 7 and 21.

In some instances it has been found desirable to count the number of stamps used, and for this purpose I have illustrated in Fig. 2 a cyclometer W, supported upon the cross bar $h^8$. This cyclometer may be of any well known make. The operating arm $W'$ thereof is, through the link $w'$ connected to the frame H. By this means the cyclometer is operated every time the stamp mechanism is actuated, thereby keeping an accurate account of the number of stamps used.

The operation of the machine is as follows: The postage stamps are torn in strips along the line of perforations, the ends of the strips pasted together, after which they are wound upon the reel $F''$, and one end of the strip carried to the stamp chute in position to be operated upon by the feeding plates O and P. Water is put into the tank $b$, from which it is fed through the pipes $b''$ and $c$ to the moistening cone $E^2$ and to the reservoir K. The case may now be closed and locked and the machine is ready for operation. An electric current, from any suitable source of supply, is turned on and through the motor $A'$ starts the machine in operation.

The envelops having previously had the inclosures placed therein, are held in the left hand of the operator as shown in Fig. 16, with the flap thereof downward. In feeding the envelops to the machine, one finger of the operator is placed in the curved portion of the bearing $d^2$ (Fig. 14), in close proximity to the roller $D'$, so as to allow but one envelop at a time to be fed into the machine, also to act as a guide for the envelop as it is passed into the feeding rollers. The envelop is gripped between the rollers $D'$ and $d, d'$, and advanced over the table F, the flap $e^4$ of the envelop extending over the edge of said table, and by means of the guide $e^3$ is directed between the surfaces of the cones $E^2$, $E^3$, the surface of the cone $E^2$ being moistened from the tube $b''$ leading from the tank $b$. The corrugated cone $E^3$ being under spring tension holds the flap of the envelop against the moistening cone as it is being advanced through the machine. As the envelop passes beyond the cone $E^2$ the flap $e^4$ is met by the closing guide $f$ which presses the flap against the envelop as it is being advanced to the rolls $D^2$, $D^3$ where it is sealed. The envelop is being advanced by the rolls $D^2$, $D^3$, until it meets the rollers G, $G'$, which continue to carry it through the machine. The arm $h$ which sets into operation the stamp mechanism, projects into the path of the envelop after it passes through the rollers G, $G'$. As the envelop meets the arm $h$ it carries it toward the rear of the machine, which movement will rock the frame H, to withdraw the stop or projection $h^5$ from the path of the projection $h^4$, thereby setting in operation the stamp feeding, moistening, cutting and sealing mechanism. During this operation the cam I has been raised until it rides against the friction wheel I' and, together with the advancing envelop, holds the frame in its elevated position until the friction plate $g$ has made one complete revolution. When the cam I has passed beyond the roller I' the frame H, H', is released and the projection $h^5$ drops into the path of the projection $h^4$ and locks the plate $g$ against further movement until another envelop is passed through the machine. After making one complete revolution the friction plate $g$ remains at rest and the envelop continues on its way through the machine, at which time the flattened surface $I^4$ of the roller $I^3$ is directly above the roller $H^3$ when said roller $I^3$ will remain stationary until another envelop passes through the machine and actuates the friction plate $g$. As soon as the roller $I^3$ reaches the position just described the stamp feeding mechanism which has been actuated by motion transmitted from said roller through the gears J, $J^3$, $J^4$, $J^5$, will also remain at rest until another envelop passes through the machine. When the friction plate $g$ is released through the mechanism previously described, it is revolved by the friction faces $g^5$, $g^6$ coming together, thereby transmitting motion to the inclined face $g^3$ and the corresponding incline $g^4$ on the roller $I^3$, which is mounted on the sleeve $I^2$. The gears J, $j$, are thus set in motion, together with the train of gears $j^3$, $j^4$, $j^2$, the latter of which is mounted on the sleeve J' carried by the shaft $B^2$. The gears J, $j$, at the same time have transmitted motion to the stamp moistening and feeding rollers, through the gears $k^5$, $k^6$, $k^8$, $k^{10}$. The gear $j^2$ which has received motion as heretofore described operates the stamp feeding mechanism.

When the mechanism is in the position shown in Fig. 1, the feeding plates O and P are in the position shown in Fig. 11. When motion is transmitted to the sleeve J' as heretofore described, the cam $m^5$ is revolved until the raised surface thereof elevates the roller $m^4$ and yoke $M^2$, to which it is attached. This action has raised the feeding plate P above and out of contact with the lower feeding plate O, and at the same time the eccentric $m^3$ has made one half of a complete revolution and has carried both feeding plates O and P to their initial position (shown in Fig. 1$^b$) at which time the raised surface upon the cam $m^5$ releases the roller $m^4$ and allows the upper feeding plate P to press down upon the stamp between it and the lower feeding plate O. The spring $m^3$ regulates the pressure of the feeding plate P. Just before the feeding plates O and P have reached their initial position (Fig. 1$^b$) the projecting arm P' comes into contact with the rock shaft $p^2$ and moves said shaft backward a short distance, sufficient to cause the feeding fingers $o^3$ to move forward until one or more of the teeth $o^4$ will engage the perforations $o^5$ between the stamps, and before the feeding plate P is released to grip the stamp beneath it, the stamp has, through the teeth $o^4$ been advanced to exactly the position to bring the line of perforations between the stamp next to the moistening roller and the stamps in the continuous strip $F^2$, directly under the blade $n'$ after said strip of stamps has been moved down the chute by the feeding plates O and P, in their next operation.

When the feeding plate P is pressed down upon the stamps the continued revolution of the eccentric $M^3$ moves the feeding plates down the chute $F^3$ until the stamp to be severed has passed from the chute and the line of perforations beneath it and the next stamp is directly beneath the cutting blade $n$ the opposite end of the stamp having been caught between the rollers K', $K^2$. The arm $m$ of the eccentric $M^3$ has completed the other half of its revolution and is moving upwardly when it strikes the roller $n^5$ which moves the cutting blade downwardly and instantly severs the stamp, by which time the arm $m$ will have passed beyond the roller $n^5$, and the tension spring $n^3$ immediately restores said blade to the position shown in Fig. 13. The severed stamp has already been caught by the rollers K', $K^2$ and has been moistened and advanced until it is gripped between rollers L and $I^3$ and carried to the surface of the envelop $F^4$, which has by this time reached the rollers $I^3$ and $H^3$ where the stamp is applied and sealed to the envelop, as shown in Fig. 20, and as it passes through the rollers $I^3$ and $H^3$ it drops through the slot Y and is ready for mailing.

In the operation of the machine the envelops are fed therein one right after the other and after the envelop is gripped by the first rollers D' and $d$, $d'$, it passes on through the machine without interruption, the mechanism for advancing, moistening and sealing the stamp to the envelop, all being so timed that each has performed its work at the proper time to coöperate with the other mechanism in making the operation of the machine continuous.

The advantages of my invention will be apparent to those skilled in the art, and while I have explained my device quite in detail I do not desire to be limited to the precise details of construction herein shown as many of the details thereof might be changed without departing from the spirit of my invention, which consists essentially in providing a machine which is continuous in its operation, and which will do its work accurately and rapidly.

In addition to the use of the machine as herein described, I contemplate the use of the sealing and stamping mechanism separately if desired. For instance, in sending out circular letters in unsealed envelops under one cent postage, the sealing mechanism may be rendered inoperative by cutting off the supply of moistening liquid which is supplied to the cone E², in which case the envelops pass through the machine and actuate the stamping mechanism in the manner heretofore described. Also if it is desired to use the envelops without stamping them, the stamping mechanism may be rendered inoperative by shutting off the supply of moistening fluid and disconnecting the strip of stamps.

I claim:

1. An envelop sealing and stamping machine, comprising moistening and sealing means at one end of the machine, moistening and stamping mechanism at the opposite end of the machine, said latter mechanism automatically operated by the envelop passing through the machine, substantially as described.

2. In an envelop sealing and stamping machine, comprising moistening and sealing mechanism at one end of the machine, moistening and stamping mechanism at the opposite end of the machine, said stamping mechanism automatically operated by the envelop passing through the machine, and means for locking said stamping mechanism against operation at predetermined intervals, substantially as described.

3. In an envelop sealing and stamping machine, the combination of the moistening and sealing mechanism, opening and closing flap guides in proximity to either side of the moistening mechanism, and stamping mechanism at the rear of the sealing mechanism.

4. In an envelop sealing and stamping mechanism, the combination of the moistening cone, opening and closing flap guides in proximity to either side of said moistening cone, a cone having a corrugated surface supported at right angles to said moistening cone and between the aforesaid flap guides, substantially as described.

5. In an envelop sealing and stamping machine, the combination of the moistening and sealing mechanism, opening and closing flap guides in proximity to either side of the moistening mechanism, sealing rollers mounted in bearings adjacent to said moistening mechanism, and means for stamping said envelops after they have passed through the sealing rollers, substantially as described.

6. In an envelop sealing and stamping machine, the combination of the moistening cones, sealing rollers mounted in bearings adjacent to said cones, and mechanism for stamping said envelops after they have passed through the sealing rollers, said mechanism automatically actuated by the advancing envelop, substantially as described.

7. In an envelop sealing and stamping machine, the combination of a revoluble moistening cone, a socket in the apex of said cone, a bearing in said socket upon which said cone revolves, a coöperating cone having a corrugated surface supported at right angles to the aforesaid moistening cone, the inclined faces of the aforesaid cones being contiguous to each other, substantially as described.

8. In an envelop sealing and stamping machine, the combination of a supporting frame, a revoluble moistening cone, said cone supported at the apex thereof upon a shaft, an adjustable coöperating cone journaled at right angles to the moistening cone, the faces of said cones being contiguous to each other, substantially as described.

9. In an envelop sealing and stamping machine, the combination of a supporting frame, a main driving shaft journaled in said frame, a revoluble moistening cone, a disk operating in frictional contact with said cone, a tank, a hollow tube having communication with said tank and the surface of the moistening cone, and a coöperating cone journaled at right angles to the moistening cone, the faces of the aforesaid cones being contiguous to each other, substantially as described.

10. In an envelop sealing and stamping machine, mechanism for moistening and sealing an envelop, in combination with means for automatically advancing the envelop through the machine, mechanism actuated by the advancing envelop to moisten and seal a stamp to said advancing envelop.

11. In an envelop sealing and stamping machine, the combination of moistening and sealing mechanism, means for advancing the sealed envelop to the stamping mechanism, a controlling arm projecting in the path of and adapted to be actuated by the advancing envelop, clutch mechanism operated by the movement of the aforesaid arm whereby the stamp mechanism is operated, and means for locking said clutch when the stamping mechanism has made one cycle of movements, substantially as described.

12. In an envelop sealing and stamping machine, the combination of means for feeding envelops singly into one end of the machine, a device for moistening the flap of each envelop, means at the rear of the moistening device for sealing the envelop, and means for continuously and uninterruptedly advancing said envelop longitudinally through the machine, substantially as described.

13. In an envelop sealing and stamping machine, the combination of a supporting frame, a revoluble shaft, an upper roller rigidly secured to said shaft, a lower roller coacting with said upper roller, a friction plate, clutch mechanism automatically operated by the advancing envelop to bring said plate into contact with the aforesaid upper roller whereby motion is transmitted to the stamp operating mechanism, substantially as described.

14. In a machine of the class described, the combination of a supporting frame, a plurality of pairs of advancing and sealing rollers, clutch mechanism automatically actuated by the advancing envelop, stamp affixing mechanism, and registering mechanism automatically operated by the stamp affixing mechanism.

15. In a machine of the class described, the combination of means for advancing an envelop through the machine, clutch mechanism operated by the advancing envelop to actuate the stamp moistening mechanism, means for severing, moistening and rolling a stamp to an envelop, and means for sealing said stamp thereon, substantially as described.

16. In a machine of the class described, a supporting frame, advancing and sealing rollers mounted upon bearings journaled in said frame, means for uninterruptedly advancing an envelop through the machine, and mechanism for severing, moistening and rolling a stamp onto the advancing envelop and sealing the same thereon, substantially as described.

17. In a machine of the class described, the combination of means for advancing an envelop through the machine, of a stamp reel and chute, feeding plates operating in said chute, cutting blades at one end of said chute, means for moistening the stamps, mechanism operated by the advancing envelop to sever, moisten and roll a stamp on to the advancing envelop, and stamp sealing rollers, substantially as described.

18. In a machine of the class described, a supporting frame, stamp sealing rollers mounted upon shafts journaled in said frame, in combination with means for advancing an envelop through the machine, a controlling arm extending into the path of the advancing envelop, clutch mechanism operated by the aforesaid arm, a stamp reel and chute, feeding plates operating in said chute cutting blades, and mechanism for automatically feeding, cutting, moistening and advancing a stamp and envelop simultaneously to the sealing rollers, substantially as described.

19. In a machine of the class described, a supporting frame, moistening and sealing rollers journaled in said frame, means for advancing an envelop through the machine, a movable arm in the path of the advancing envelop, a stamp chute and feeding plates operating therein, stamp cutting and moistening mechanism, and means for applying and sealing a stamp to each advancing envelop, substantially as described.

20. In a machine of the class described, the combination of a supporting frame, means for continuously and uninterruptedly advancing an envelop through the machine, an arm extending in the path of the advancing envelop and adapted to be actuated thereby, means for locking said arm at predetermined intervals, clutch mechanism adapted to be released by each advancing envelop, a stamp chute, stamp advancing, cutting and moistening mechanism, and mechanism automatically operated by the aforesaid clutch mechanism to advance, cut, moisten and affix a stamp to the advancing envelop, substantially as described.

21. In a machine of the class described, envelop moistening and sealing mechanism, a stamp chute, cutting blades, feeding fingers adapted to engage in perforations between the stamps to move the stamps forward, and mechanism automatically operated by the advancing envelop to cut, moisten and seal a stamp to each advancing envelop.

22. In a machine of the class described, envelop moistening and sealing mechanism, a reel adapted to hold a plurality of stamps arranged in a continuous strip, a stamp chute, cutting blades, feeding fingers adapted to engage in perforations between the stamps, and mechanism automatically operated by the advancing envelop to cut, moisten and seal a stamp upon each advancing envelop.

23. In a machine of the class described, the combination of envelop moistening and sealing mechanism, a stamp chute, cutting blades at one end of said chute, feeding fingers adapted to aline the stamps so that a line of perforations is between the cutting blades at each operation, a moistening roller, and means for gripping each stamp and advancing it after it leaves the moistening roller, substantially as described.

24. In a machine of the class described, the combination of envelop moistening and sealing mechanism, a stamp moistening device, means for advancing one stamp at a time over said device, sealing rollers, and means for stripping and guiding said stamp from the moistening device to the sealing rollers, substantially as described.

25. In an envelop sealing and moistening mechanism, the combination of a supporting frame, a main driving shaft journaled in said frame, a revoluble moistening cone, said cone supported at the apex thereof upon a shaft, a disk operating in frictional contact with said cone, an adjustable coöperating cone journaled at right angles to the moistening cone, the faces of the aforesaid cones being contiguous to each other, and opening and closing flap guides supported upon either side of the meeting faces of the aforesaid cones, substantially as described.

26. In an envelop sealing and stamping machine, the combination of a supporting frame, a revoluble moistening cone, means for revolving said cone, an adjustable cone journaled at right angles to the moistening cone and the faces of said cones being contiguous to each other, a table above said moistening cone, opening and closing flap guides supported beneath said table and upon each side of the meeting faces of the aforesaid cones, advancing rollers in front of said table and moistening cone, and sealing rollers at the rear thereof, substantially as described.

27. In an envelop sealing and stamping machine, the combination of a supporting frame, means for moistening and sealing envelops, a revoluble stamp reel, a stamp chute, stamp feeding plates and means for automatically operating said feeding plates, said means being actuated by the envelop passing through the machine, substantially as described.

28. In an envelop sealing and stamping machine, the combination of a supporting frame, envelop moistening and sealing mechanism supported in said frame, means for advancing the envelops after they leave the sealing mechanism, an arm projecting in the path of the advancing envelop, and stamp moistening and sealing mechanism controlled by the aforesaid arm, substantially as described.

29. In an envelop sealing and stamping machine, the combination of a supporting frame, moistening and sealing mechanism supported in said frame, means for advancing the envelops after they leave the sealing mechanism, an arm projecting in the path of the advancing envelop, and stamp affixing mechanism controlled by the aforesaid arm, substantially as described.

30. In an envelop sealing and stamping machine, the combination of a supporting frame, moistening cones, opening and closing flap guides supported in proximity to said cones, sealing rollers at the rear of said moistening cones, means for advancing the envelop through the machine, stamp moistening and sealing mechanism, and clutch mechanism released by the advancing envelop to operate the aforesaid stamp moistening and sealing mechanism.

31. In an envelop sealing and stamping machine, the combination of a supporting frame, advancing and sealing rollers journaled in said frame, means for operating said rollers, a revoluble moistening cone supported near the front of the machine, a stamp reel and chute, and automatically operated stamp moistening and sealing mechanism at the rear of the moistening device, substantially as described.

32. In an envelop sealing and stamping machine, the combination of the moistening cones, advancing and sealing rollers in front of and at the rear of said cones, a stamp reel and chute, a reservoir, a stamp moistening roller journaled in said reservoir near the end of the aforesaid stamp chute, and means for severing a stamp before it reaches the moistening roller, substantially as described.

33. In an envelop sealing and stamping machine, the combination of the moistening and sealing mechanism, a stamp reel and a chute down which the stamps are fed, cutting blades at the end of said stamp chute, a reservoir, a moistening roller journaled in said reservoir, feeding plates traveling in the aforesaid stamp chute whereby the stamps are fed to the cutting blades, and means for automatically operating said feeding plates and cutting blades, substantially as described.

34. In an envelop sealing and stamping machine, the combination of the moistening and sealing mechanism, means for advancing an envelop through the machine, a stamp holder and chute, cutting blades at the end of the stamp chute, means for advancing the stamps to the cutting blades, means automatically operated by the advancing envelop to operate said cutting blades, a stamp moistening roller, and means for sealing the moistened stamp upon the advancing envelop, substantially as described.

35. In an envelop sealing and stamping machine, the combination of the moistening and sealing mechanism, envelop advancing mechanism, with means for automatically stamping each advancing envelop, said means comprising a sectional frame, an arm carried by said frame and extending into the path of said advancing envelop, a stamp holder and chute down which the stamps are fed, cutting blades and stamp moistening mechanism in proximity to said chute, and stamp sealing rollers, substantially as described.

36. In an envelop sealing and stamping machine, the combination of the envelop mechanism, the combination of the moistening and sealing mechanism, with the moistening and sealing mechanism, stamp moistening and sealing mechanism, means for advancing an envelop through the machine, an arm projecting in the path of the advancing envelop and adapted to be actuated thereby, a stamp holder and chute down which the stamps travel, and means for automatically advancing said stamps to the moistening and sealing mechanism.

37. In an envelop sealing and stamping machine, the combination of the moistening and sealing mechanism, means for advancing an envelop through the machine, stamping mechanism automatically operated by the advancing envelop, a stamp chute, feeding plates operating in said stamp chute, means for operating said feeding plates to advance the stamps, cutting blades at the end of the stamp chute adapted to sever each stamp as it passes therethrough, a moistening roller, and guide fingers between said moistening roller and the sealing rollers, substantially as described.

38. In an envelop sealing and stamping machine, the combination of envelop moistening and sealing mechanism and means for uninterruptedly advancing the sealed envelop through the machine, with stamp moistening and sealing mechanism comprising a stamp reel and chute, stamp advancing mechanism automatically operated by each advancing envelop, automatically operated stamp severing mechanism, and automatically operated stamp moistening and sealing mechanism.

39. In an envelop sealing and stamping machine, the combination of the moistening and sealing mechanism with means for advancing each envelop through the machine, a stamp chute, guide plates at the end of said chute, means for advancing and severing a single stamp at a time, and mechanism automatically operated by the advancing envelop for moistening and affixing a stamp thereon, substantially as described.

40. In an envelop sealing and stamping machine, the combination of moistening and sealing mechanism with means for uninterruptedly advancing an envelop through the machine, an arm extending in the path of the advancing envelop, a roller mounted upon a revoluble shaft, a friction plate provided with a collar having an inclined face, an oppositely faced incline in proximity thereto, a stop projecting from the aforesaid friction plate, said stop adapted to be released by the advancing envelop, whereby said friction faces are brought into contact with each other to operate the stamping mechanism, substantially as described.

41. In a sealing and stamping machine, the combination of envelop moistening and sealing mechanism, means for advancing the envelops through the machine, a friction faced roller rigidly secured to a revoluble shaft, a friction plate in proximity to said roller, a collar having an inclined face, a sleeve in proximity thereto, said sleeve presenting a coöperating oppositely inclined face, and clutch mechanism released by each advancing envelop to bring said friction faces into contact with each other to operate the stamping mechanism.

42. In an envelop sealing and stamping machine, envelop moistening and sealing mechanism, means for advancing an envelop through the machine, a stamp chute and feeding plates operating in said chute, a revoluble shaft, a fixed member and a loose member carried upon said shaft, oppositely faced inclines upon the contiguous ends of said fixed and loose members, and clutch mechanism adapted to be released by each advancing envelop to operate the aforesaid mechanism.

43. In a sealing and stamping machine, envelop moistening and sealing mechanism, in combination with means for advancing an envelop through the machine and simultaneously operating the stamping, moistening and sealing mechanism, a stamp chute, feeding plates and fingers operating in said chute, an eccentric block and cam operating said plate and fingers, a reservoir, a stamp moistening roller mounted in said reservoir, guide plates, a controlling arm projecting in the path of the advancing envelop and adapted to be operated by said envelop whereby motion is simultaneously transmitted to the stamp advancing mechanism, substantially as described.

44. In a sealing and stamping mechanism, the combination of envelop moistening and sealing mechanism, means for advancing an envelop through the machine, with stamping mechanism, comprising an arm projecting in the path of the advancing envelop, a revoluble shaft, a friction plate, locking and releasing mechanism, a stamp chute, stamp feeding plates movable longitudinally in said chute, cutting blades, a reservoir and moistening roller therein, said stamping mechanism adapted to be operated by the advancing envelop, substantially as described.

45. In a machine of the class described, the combination with a supporting frame, mechanism for moistening and sealing an envelop and uninterruptedly advancing it through the machine, a sectional frame, stamp moistening and sealing mechanism, a stamp chute and feeding plates operating therein, cutting blades, and a stamp moistening roller supported in proximity to said stamp chute, and clutch mechanism adapted to be released by the advancing envelop to operate the aforesaid stamp moistening and sealing mechanism.

46. In a machine of the class described, the combination of envelop moistening and sealing mechanism with stamp moistening and sealing mechanism, means for advancing each envelop from the sealing to the stamping mechanism, mechanism automatically operated by each advancing envelop to engage the perforations between the stamps and mechanism to affix a stamp to each advancing envelop.

47. In a machine of the class described, the combination of mechanism for moistening and sealing an envelop, means for advancing a sealed envelop longitudinally through the machine and means automatically operated by the advancing envelop to affix a stamp thereto as the envelop is advancing, substantially as described.

48. The combination with an envelop feeding device and means for automatically affixing stamps to envelops so fed, of intermediate mechanism for throwing the stamp affixing means out of operation upon the failure of an envelop to be fed by said feeding device.

49. The combination with envelop-feeding and stamp affixing mechanism, of a main shaft and operative connections between the same and said envelop feeding mechanism and said stamp affixing mechanism, means for operating said envelop feeding mechanism independently of said stamp-affixing mechanism and means actuated by the envelop and controlling the operation of the stamp affixing mechanism.

50. In a machine substantially as described, the combination with the mulitated pulley and stamp feeding devices operated thereby, of a drive pulley for operating the mutilated pulley, means whereby an envelop passed through the machine may move the mutilated pulley into engagement with the drive pulley, and detent means for restraining the mutilated pulley after the desired operation by the drive pulley.

51. The combination of a frame, means for feeding envelops singly and in succession along said frame; a holder adapted to support a series of postage stamps secured together end to end in the form of a continuous web and extending to a position near the path of said envelops and at one side thereof; a cutter controlled by the passage of an envelop and adapted to cut a stamp from such web during the passage of each envelop; and a member adapted to move the stamp against the envelop while moving at the same speed therewith.

52. The combination of a frame, means for feeding envelops singly and in succession along said frame; a holder adapted to support a series of postage stamps secured together end to end in the form of a web and extending to a position near the path of said envelops and at one side thereof, a cutter controlled by the passage of an envelop and adapted to cut a stamp from such web during the passage of each envelop; and a rotating member adapted to push the stamp against the envelop while moving at a peripheral speed equal to that of the envelop.

53. In a machine of the type set forth, the combination with the shearing knife, the device for feeding the stamp strip toward the knife, and means for actuating the feeding device, of means actuated by the feed actuating means for registering the stamp perforations with respect to the shearing knife.

In testimony whereof, I have signed this specification in the presence of two subscribing witnesses.

JOSEPH J. SCHERMACK.

Witnesses:
ROBT. T. CLEGG,
C. S. CORNING.